(12) United States Patent
Winata (10) Patent No.: US 10,313,003 B2
(45) Date of Patent: Jun. 4, 2019

(54) SYSTEMS AND METHODS FOR WIRELESSLY PAIRING A FITNESS MACHINE TO AN ACCESSORY

(71) Applicant: Brunswick Corporation, Lake Forest, IL (US)

(72) Inventor: Roni Hendra Winata, Singapore (SG)

(73) Assignee: Brunswick Corporation, Mettawa, IL (US)

( * ) Notice: Subject to any disclaimer, the term of this patent is extended or adjusted under 35 U.S.C. 154(b) by 82 days.

(21) Appl. No.: 15/369,986

(22) Filed: Dec. 6, 2016

(65) Prior Publication Data

US 2018/0159618 A1 Jun. 7, 2018

(51) Int. Cl.
*H04B 7/24* (2006.01)
*H04W 4/80* (2018.01)
*H04W 8/00* (2009.01)

(52) U.S. Cl.
CPC .............. *H04B 7/24* (2013.01); *H04W 4/80* (2018.02); *H04W 8/005* (2013.01)

(58) Field of Classification Search
CPC ..... H04W 4/008; H04W 8/005; H04W 12/06; H04W 84/12; H04W 84/18; H04W 88/06; H04W 12/04; H04W 12/08; H04W 36/0055; H04W 36/0066; H04W 36/30; H04W 4/005; H04W 4/04; H04W 68/005; H04B 5/0031; H04B 5/00; H04B 5/0037;
(Continued)

(56) References Cited

U.S. PATENT DOCUMENTS

| 7,938,027 B2 | 5/2011 | Topel et al. |
| 8,271,662 B1 * | 9/2012 | Gossweiler, III ... H04M 1/6066 709/227 |

(Continued)

FOREIGN PATENT DOCUMENTS

| EP | 1755098 | 2/2007 |
| EP | 1755275 | 2/2007 |
| EP | 1758040 | 2/2007 |

OTHER PUBLICATIONS

"Bluetooth® Secure Simple Pairing Using NFC," published by Bluetooth® Special Interest Group, NFC Forum: Jan. 9, 2014.
(Continued)

*Primary Examiner* — Golam Sorowar
(74) *Attorney, Agent, or Firm* — Andrus Intellectual Property Law, LLP (57) ABSTRACT

Systems and methods for wirelessly pairing a fitness machine to an accessory, the fitness machine having a setup module configured to communicate with the accessory using a setup protocol and having a Bluetooth® module configured to communicate with the accessory using a Bluetooth® protocol. The fitness machine is configured to receive a unique ID from the accessory using the setup protocol and the fitness machine is configured to wirelessly pair with the accessory using a Bluetooth® protocol. The systems and methods include an advertising packet configured to be communicated from the fitness machine to the accessory using the Bluetooth® protocol and the advertising packet includes the unique ID received from the accessory. The fitness machine is configured to wirelessly pair with the accessory when the accessory identifies the unique ID included in the advertising packet.

17 Claims, 4 Drawing Sheets

(58) Field of Classification Search
CPC .. H04B 5/0056; H04B 5/0062; H04B 5/0075; H04B 5/02; H04B 5/06; H04B 7/26; H04M 1/7253; H04M 2250/02; H04M 1/6066; H04M 1/72558; H04M 2250/04; H04M 2250/06

See application file for complete search history.

(56) References Cited

U.S. PATENT DOCUMENTS

| | | | |
|---|---|---|---|
| 8,432,262 | B2 | 4/2013 | Talty et al. |
| 8,666,313 | B2 | 3/2014 | Preston et al. |
| 9,125,180 | B1* | 9/2015 | Hamilton ............... H04L 67/34 |
| 2008/0242511 | A1 | 10/2008 | Munoz et al. |
| 2010/0203829 | A1* | 8/2010 | Granqvist ............ A61B 5/0002 |
| | | | 455/41.1 |
| 2011/0028091 | A1 | 2/2011 | Higgins et al. |
| 2015/0296020 | A1* | 10/2015 | Granqvist ............ H04W 76/14 |
| | | | 455/41.2 |
| 2017/0026778 | A1* | 1/2017 | Yamada ............... H04W 4/008 |

OTHER PUBLICATIONS

International Search Report and Written Opinion, PCT/US2017/05789, dated Nov. 17, 2017.

* cited by examiner

SYSTEMS AND METHODS FOR WIRELESSLY PAIRING A FITNESS MACHINE TO AN ACCESSORY

FIELD

The present disclosure generally relates to systems and methods for fitness machines, and more particularly to wirelessly pairing a fitness machine to an accessory using Bluetooth®.

BACKGROUND

This Background and Summary are provided to introduce a selection of concepts that are further described below in the Detailed Description. The Background and Summary are not intended to identify key or essential features of the claimed subject matter, nor are they intended to be used as an aid in limiting the scope of the claimed subject matter.

The following U.S. Patents and Patent Applications are incorporated herein by reference in their entirety:

U.S. Pat. No. 7,938,027 discloses a system, method, and machine readable media related to determining a condition of an exercise machine belt. An example system includes a sensor to detect an event related to the exercise machine belt. The example system also includes a counter to selectively change a count based on the event as well as an output device to output a notification associated with the condition of the exercise machine belt based on the count.

U.S. Patent Application Publication No. 2008/0242511 discloses user interface methods and an apparatus for controlling an exercise apparatus. An example user interface includes an exercise parameter input and an indicator associated with the exercise parameter input, and a control unit to activate the indicator in response to a training routine to prompt a user of the exercise apparatus to adjust an operation of the exercise apparatus via the exercise parameter input.

European Patent Application No. 1,758,040 discloses systems and methods for implementing a fitness network system. The disclosed example system includes a first data terminal operatively coupled to an exercise machine. The first data terminal is configured to obtain fitness information associated with a fitness member from the exercise machine. The example system also includes a personal digital assistant wirelessly communicatively coupled to the first data terminal via a network. The first data terminal is configured to communicate a first message to the personal digital assistant based on the fitness information. The personal digital assistant enables a fitness trainer to communicate a message to the fitness member based on the first message.

European Patent Application No. 1,755,098 discloses systems and methods for implementing a physical rehabilitation system. The disclosed example system includes at a first location an exercise machine and a biometric sensor configured for use by a person. The example system further includes at a second location a computing device communicatively coupled to the exercise machine and the biometric sensor, wherein the computing device is configured to obtain fitness information from the exercise machine and the biometric sensor. The computing device is further configured to provide configuring data to the exercise machine, wherein the configuring data is determined by a medical professional in response to at least one of the obtained fitness information, a medical history of the person, or a medical status of the person.

European Patent Application No. 1,755,275 discloses methods and an apparatus for monitoring quality of service for an exercise machine communications network. A disclosed example system for monitoring a quality of service for an exercise machine communication network comprises a server and an exercise machine console communicatively coupled to the server via the exercise machine communication network and operatively coupled to an exercise machine. The exercise machine console is configured to communicate exercise machine usage information to the server, and the server is configured to determine network performance associated with the exercise machine network based on the exercise machine usage information.

SUMMARY

The present disclosure relates to a system for pairing wireless devices that includes a fitness machine having a setup module configured to communicate with an accessory using a setup protocol and having a Bluetooth® module configured to communicate with the accessory using a Bluetooth® protocol. The fitness machine is configured to receive a unique ID from the accessory using the setup protocol. The fitness machine is configured to wirelessly pair with the accessory using a Bluetooth® protocol. The system includes an advertising packet configured to be communicated from the fitness machine to the accessory using the Bluetooth® protocol, wherein the advertising packet includes the unique ID received from the accessory. The fitness machine is configured to wirelessly pair with the accessory when the accessory identifies the unique ID included in the advertising packet.

In another embodiment, the method includes providing a fitness machine to be wirelessly paired with the accessory, wherein the fitness machine is configured to wirelessly pair with the accessory using a Bluetooth® protocol. The fitness machine receives a unique ID that is communicated from the accessory using a setup protocol, wherein the unique ID is associated with the accessory. The fitness machine communicates an advertising packet to the accessory using the Bluetooth® protocol, wherein the advertising packet is associated with the fitness machine and includes the unique ID. The fitness machine and the accessory are wirelessly paired using the Bluetooth® protocol when the accessory identifies the unique ID included in the advertising packet.

In another embodiment, a system for wirelessly pairing devices includes a fitness machine having an NFC reader that communicates using a near-field protocol and a Bluetooth® radio that communicates using a Bluetooth® protocol. A wearable accessory having an NFC tag communicates using the near-field protocol and a Bluetooth® radio communicates using the Bluetooth® protocol. A unique ID is associated with the accessory and is communicated from the NFC tag to the NFC reader. An advertising packet that includes the unique ID is communicated from the Bluetooth® radio of the fitness machine to the Bluetooth® radio of the accessory. The fitness machine is configured to wirelessly pair with the accessory using the Bluetooth® protocol when the accessory identifies the unique ID included in the advertising packet.

Various other features, objects and advantages of the disclosure will be made apparent from the following description taken together with the drawings.

BRIEF DESCRIPTION OF THE DRAWINGS

The drawings illustrate the best mode presently contemplated of carrying out the disclosure. The same numbers are used throughout the Figures to reference like features and like components. In the drawings.

DETAILED DISCLOSURE

This written description uses examples to disclose embodiments of the disclosed invention, including the best mode, and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In recent years, the miniaturization and reduced costs of integrated circuits, along the consequent increase in the presence of wearable devices, such as smartphones, watches, and clothing, have led to increased opportunities and interests for wirelessly integrating such wearable devices with other items. Among the various protocols that enable wireless communication between such devices, Bluetooth® and Bluetooth® Low Energy (BLE or Bluetooth® LE), as well as near-field communication (NFC), have become standard mechanisms of communication across a wide array of devices.

The Bluetooth® LE protocol involves two parties with different roles: the central device and the peripheral device. These roles define the responsibility each has in establishing the wireless connection, which is known as the wireless pairing process. The peripheral device has the responsibility of broadcasting advertising packets. The advertising packets contain information that identifies the peripheral device and some of its primary capabilities. On the other hand, the central device listens for any peripheral device that is broadcasting advertising packets that it is interested in. The central device can then initiate and send a connection request to a particular peripheral device that it has discovered by listening to the broadcasted advertising packets.

Typically, the peripheral device also behaves as a server that provides services that can be accessed by the central device. The services consist of one or more characteristics, including reading, writing, and notifying. In the case of a typically known wearable device, the wearable device acts as the central device or client to discover and initiate the connection to another item, such as a fitness machine. In this configuration, the wearable device uses information served to it by the fitness machine acting as the peripheral device or server to assist in the wearable device accomplishing some task. For example, the fitness machine may communicate data to the wearable device such as the duration of exercise, number of calories burned, or other user-defined metrics. Likewise, the fitness machine may receive data communicated from the wearable device, such as an exercise program to execute, streaming music, or the presence of an incoming phone call.

NFC has been used to simplify this Bluetooth® pairing process in terms of both time and effort. The Bluetooth® LE out-of-band (OOB) pairing process is a known mechanism to streamline the process of initiating wireless Bluetooth® pairing using NFC. The process is described in the publication "Bluetooth® Secure Simple Pairing Using NFC", which was published by the Bluetooth® Special Interest Group of the NFC forum on Jan. 9, 2014 and is incorporated by reference. In this mechanism, the central device reads authentication information from the NFC tag on the peripheral device, which is later used to set up the Bluetooth® LE connection.

To further explain the OOB pairing process, an example of pairing a wearable device with a fitness machine is provided. In this example, an exerciser having a wearable device intends to establish a Bluetooth® LE connection between the wearable device (the "central device") and the fitness machine (the "peripheral device") so that the wearable device can access and consume fitness data served by the fitness machine. The wireless Bluetooth® connection is initiated by positioning the wearable device near an NFC reader within the fitness machine. Once established, the NFC connection between the fitness machine and the wearable device is used to communicate essential setup information needed to establish the Bluetooth® connection, such as the fitness machine's Bluetooth® address and other parameters. This is in contrast to the typical Bluetooth® pairing process, which communicates the Bluetooth® address and other parameters via advertising packets sent using the Bluetooth® protocol. By instead communicating this setup information through NFC, the step of broadcasting advertising packets is bypassed and the wearable device and the fitness machine pair over Bluetooth®. Similarly, since NFC implicitly requires close proximity between the devices to be paired (typically within two inches), this OOB process eliminates the step for manually selecting which of the detected advertising packets corresponds to the device of interest. Consequently, the OOB mechanism may shorten or simplify the process of establishing the connection over traditional Bluetooth® pairing mechanisms.

While this OOB mechanism can simplify the process and shorten the time of establishing a Bluetooth® connection between two devices, the present inventor has identified that this mechanism has substantial limitations. Most notably, the OOB mechanism requires that the wearable device, or central device, has an NFC reader. Consequently, there is no known mechanism for simplifying and shortening the process of establishing a Bluetooth® connection with a wearable device that does not support an NFC reader mode.

Figure 1:
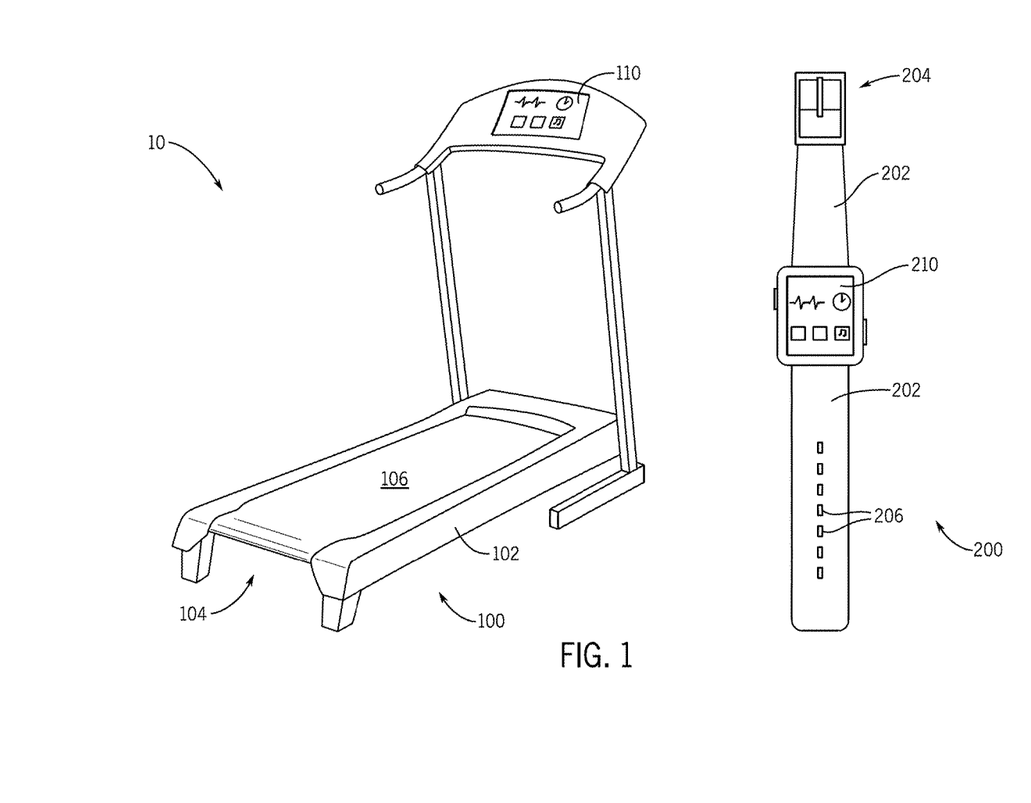
FIG. 1 illustrates a fitness machine and an accessory to be wirelessly paired in accordance with the present disclosure.

Through experimentation and development, the present inventor has developed systems and methods for simplifying the process of obtaining a wireless Bluetooth® connection between two devices without relying on the OOB mechanism, as provided herein. FIG. 1 shows an exemplary system 10 that includes a fitness machine, shown generally as source device 100, that is intended to be wirelessly paired over Bluetooth® with an accessory device 200. It should be noted that wireless pairing implies a bidirectional connection; thus, it does not matter which device is listed first as being "wirelessly paired" to the other device. In the example shown, the fitness machine is a treadmill and the accessory device is a wearable device, specifically a smart watch. However, it should be noted that the systems and methods disclosed herein anticipate applications with a wide variety of source devices and accessory devices.

In the embodiment shown, the source device 100 has a support structure 102 that contains and provides support for a drive system 104 that rotates a belt 106. In the configuration shown, a person having ordinary skill in the art would recognize that a user of the source device 100 may activate the drive system 104 to cause the belt 106 to move as an endless circuit, permitting the user to run on the belt 106 as a means for obtaining exercise. In the embodiment shown, the source device 100 includes a graphical user interface (GUI) 110 to allow the user to input commands, display data, and to control various functions of the source device 100.

FIG. 1 further depicts an exemplary accessory device 200, shown as a smart watch. In accordance with smart watches known in the art, the smart watch may be configured to wirelessly communicate through Wi-Fi, NFC, Bluetooth®, and/or other known protocols. The accessory device 200 contains a GUI 210 to allow the user to input commands, display data, and to control various functions of the accessory device 200. The accessory device 200 is configured to be worn on the wrist of the user using a strap 202 extending from one end near the GUI 210 to a male closure 204 and a strap 202 extending from one end near the opposite side of the GUI 210 to a female closure 206. Thus, the accessory device 200 is configured to be worn in a similar manner as a conventional wristwatch.

Figure 2:
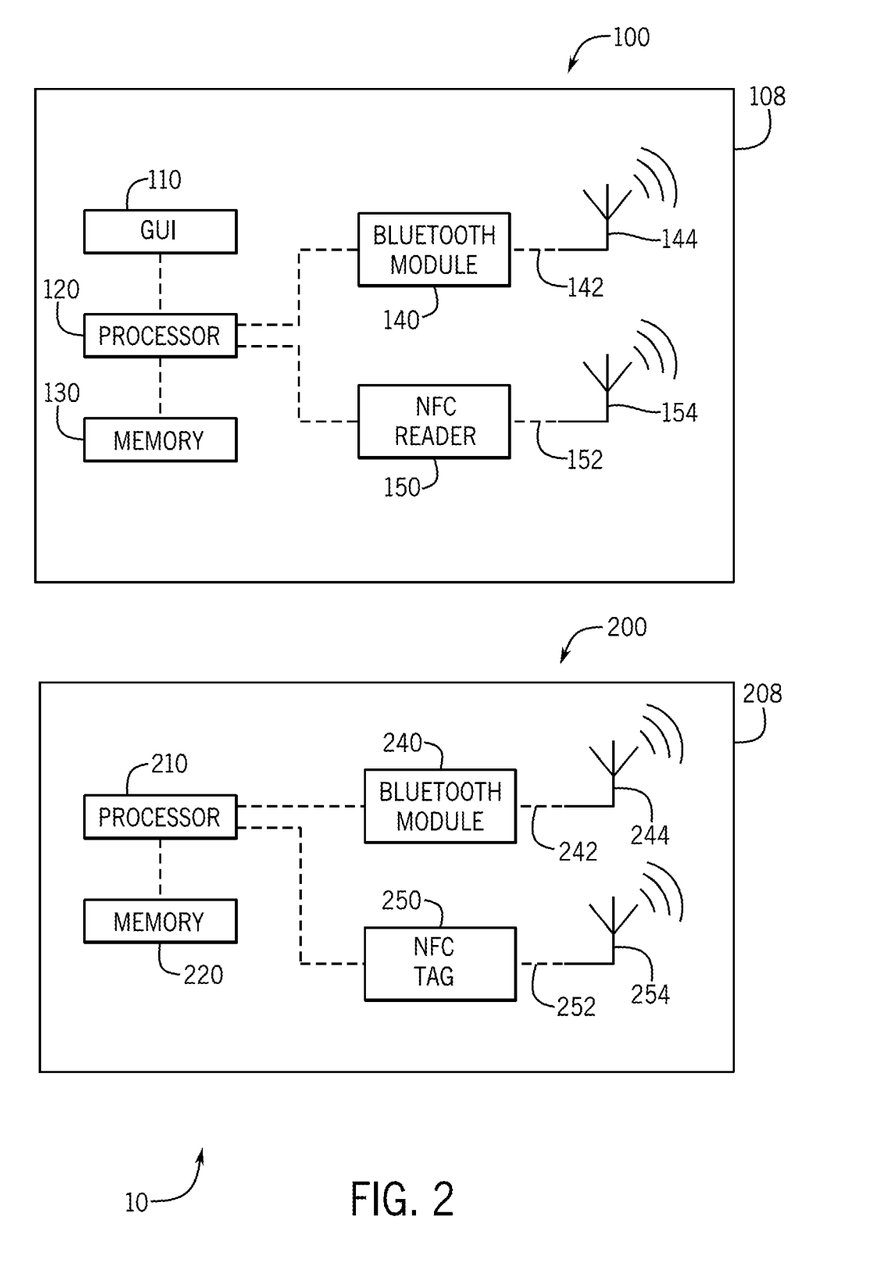
FIG. 2 shows schematic representations of the fitness device and the accessory to be wirelessly paired.

FIG. 2 illustrates an exemplary control module 108 for the source device 100 and an exemplary control module 208 for the accessory device 200, which together enable wireless pairing of the source device 100 and accessory device 200 according to the present disclosure. The control module 108 includes the GUI 110 as previously discussed, which communicates with a processor 120 that communicates with a non-transitory memory 130 that contains a program to operate the control module 108. It should be recognized that the source device 100 may alternatively not include a GUI 110. Further, the dotted lines in FIG. 2 depict only possible electrical connections within the control module 108 demonstrate that the elements are capable of communicating with one another, but do not indicate required wiring of any elements therein and do not represent the only paths of communication between elements.

In the embodiment shown, the processor 120 is in communication with a Bluetooth® module 140 that communicates using a Bluetooth® protocol 142 using a Bluetooth® antenna 144. Likewise, the processor 120 communicates with a Setup module that communicates using a setup protocol through a setup antenna. In the embodiment shown, the setup module is an NFC Reader 150, the setup protocol is near-field communication 152, and the setup antenna is an NFC antenna 154.

However, the present inventor has determined that other setup protocols having corresponding setup modules and setup antennae are also possible. By way of non-limiting example, this includes an embodiment wherein the setup module is an RFID Reader, the setup protocol is RFID communication, and the setup antenna is an RFID antenna. In another embodiment, the setup module is an input within the GUI 110 of the source device 100 (such as a touch screen), the setup protocol is manual entry of information, including the unique ID from the accessory device 200 into the GUI 110, and the setup antenna is displaying the unique ID on the GUI 210 of the accessory device 200 and a user transcribing this unique ID from the GUI 210 to the GUI 110 for manual entry.

The control module 208 of the accessory device 200 includes a processor 220 in communication with a non-transitory memory 230 having a program, or executable code (coexistent with 230), to operate the control module 208 in order to execute certain steps describe herein. The processor 220 is in communication with a Bluetooth® module 240 that communicates using a Bluetooth® protocol 242 through a Bluetooth® antenna 244. Likewise, the processor 220 communicates with a setup module that communicates using a setup protocol through the setup antenna. In the embodiment shown, the setup module is an NFC tag 250, the setup protocol is near-field communication 252, and the setup antenna is an NFC antenna 254. Specifically, the NFC tag 250 is a passive NFC tag that can be powered and read by an NFC reader, such as the NFC Reader shown in the exemplary control module 108 of the source device 100 as previously discussed. Therefore, the present embodiment of the control module 208 is not capable of functioning as an NFC reader, and thus not capable of establishing a Bluetooth® connection using the OOB mechanism.

As previously discussed with regard to the source device 100, other types of modules that communicate using different protocols and corresponding antennae would also be known to a person having ordinary skill in the art.

Figure 3:
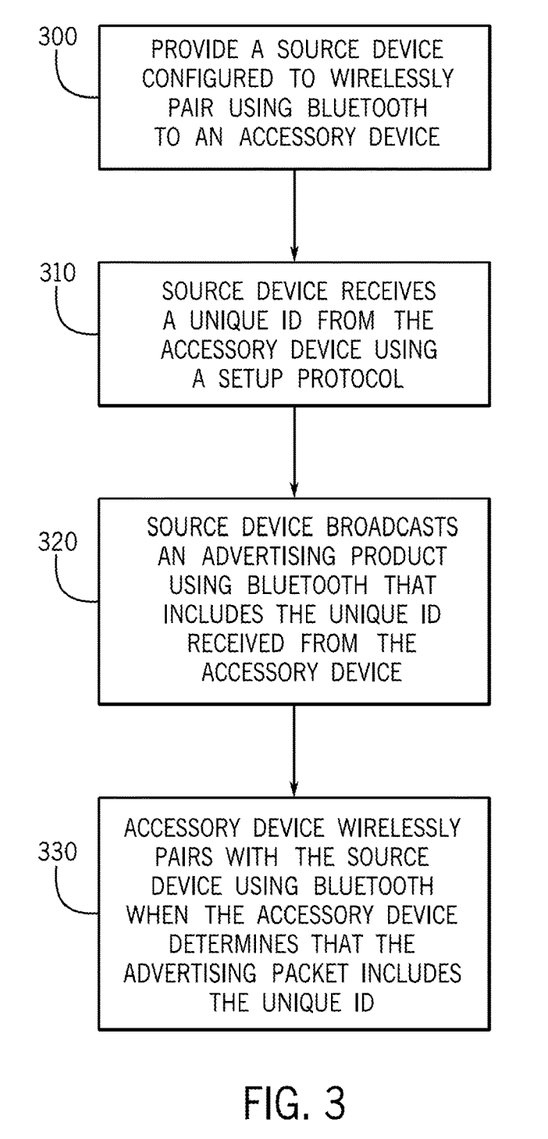
FIGS. 3 and 4 illustrate various methods for wirelessly pairing the devices.

FIG. 3 depicts an exemplary method for a source device 100 to wirelessly pair to an accessory device 200 using the Bluetooth® protocol. In step 300, a source device 100 is provided that is configured to wirelessly pair to an accessory device 200 using the Bluetooth® protocol. In step 310, the source device 100 receives a unique ID communicated from the accessory device 200 using the setup protocol. In step 320, the source device 100 broadcasts an advertising packet using the Bluetooth® protocol that includes the unique ID received by the source device 100 from the accessory device 200 in step 310. In step 330, the source device 100 and the accessory device 200 wirelessly pair using the Bluetooth® protocol when the accessory device 200 identifies that the unique ID associated with that accessory device 200 is included in the broadcasted advertising packet from the source device 100 in step 320. It would be known by a person having ordinary skill in the art that the accessory device scans for broadcasted advertising packets using its Bluetooth® radio.

The method illustrated in FIG. 3 simplifies the process of obtaining a wireless Bluetooth® connection between the source device 100 and the accessory device 200 by including the unique ID associated with the accessory device 200 within the broadcasted advertising packet of the source device 100. Notably, this simplified method does not utilize the OOB mechanism known in the art, which bypasses the broadcasting of advertising packets altogether. As such, the presently disclosed method continues to communicate the Bluetooth® address and other parameters needed for pairing over through the use of broadcasting advertising packets using the Bluetooth® protocol.

Figure 4:
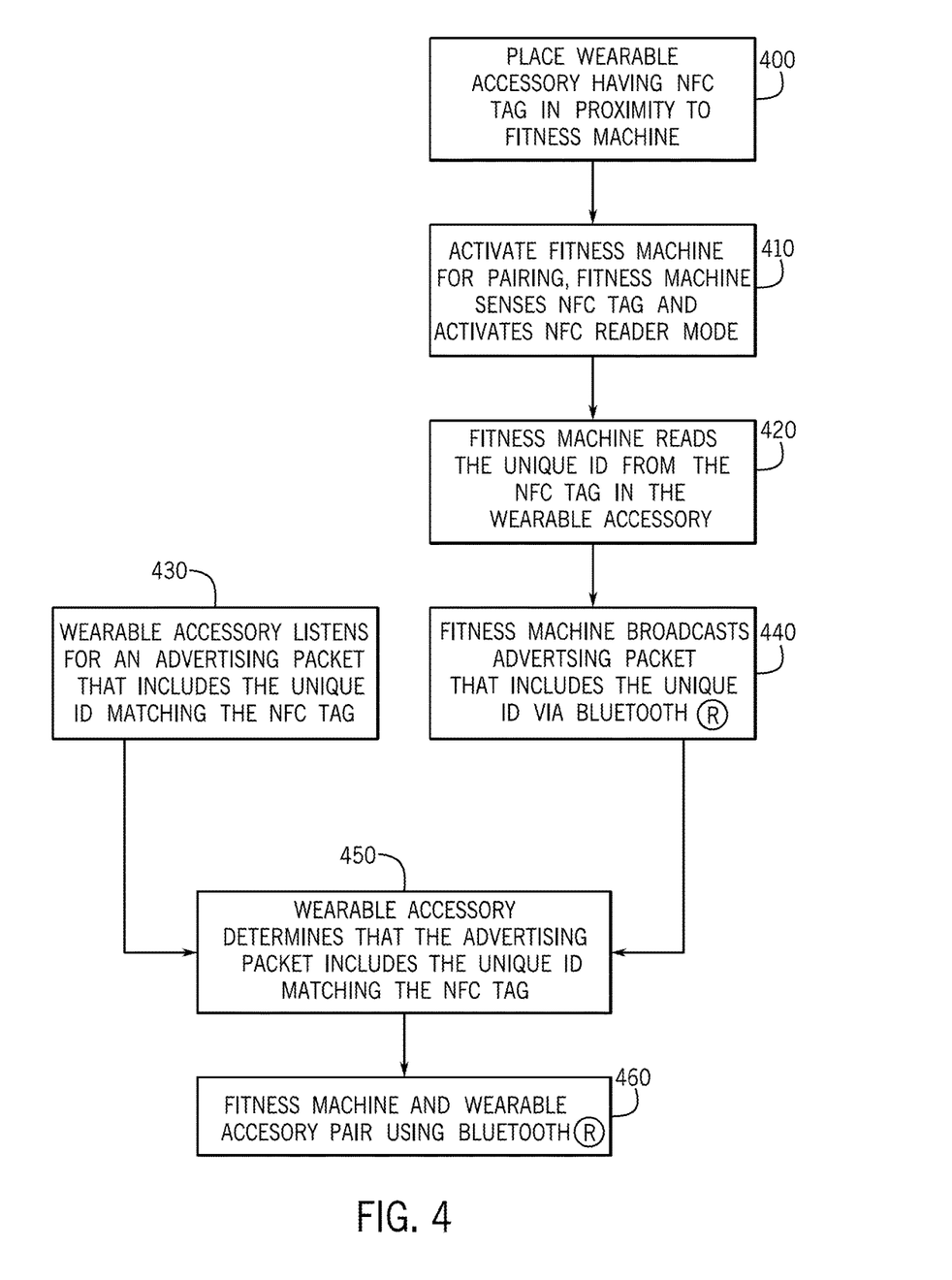

FIG. 4 illustrates another exemplary method for simplifying the process of initiating a wireless Bluetooth® connection between the source device 100 and the accessory device 200, this time including control over the accessory device 200. In the embodiment shown, the source device 100 is a fitness machine, the accessory device 200 is a wearable accessory, and at least some functions of the source device 100 and the accessory device 200 are controlled by the respective programs stored in the respective non-transitory memory 130 and non-transitory memory 230 therein.

In step 400, an accessory device 200, specifically a wearable accessory having an NFC tag, is placed in proximity to a source device 100, specifically a fitness machine having an NFC reader. The present inventor has found that by including an NFC tag in the accessory device 200, which is only capable of communicating within approximately two inches, the present method is inherently secure. Specifically, due to this limited range of communication only one source device 100 and one accessory device 200 are expected to be within range of each other during normal operation.

In step 410, the user activates the fitness machine for pairing, which may include pressing a button or interacting with the GUI 110 on the fitness machine. It should be known that in an alternative embodiment, the fitness machine may be configured to continuously seek out and read any NFC tags within close proximity, eliminating the need for activating the process in step 410. However, the present inventors have identified that by including step 410 for activation, accidental pairing between the source device 100 and accessory device 200 can be avoided. Likewise, the source device 100 can conserve energy by not operating the NFC Reader 150 or other setup module except when necessary.

In response to activating in step 410, the fitness machine reads the unique ID from the NFC tag within the wearable accessory in step 420. In some embodiments, the unique ID is generated specifically for a particular unit of the accessory device 200. In other words, the unique ID may be common across all accessory devices of a particular make and model, or may be custom for a particular unit of an accessory device 200. Moreover, in some embodiments, the unique ID is generated specifically for a particular session of pairing between the source device 100 and the accessory device 200. In this regard, a new unique ID is generated each time a wireless pairing process is initiated, avoiding issues with the accessory device 200 accidentally pairing to nearby a source device 100 that has been previously paired to it in the past. In conjunction, the accessory device 200 is configured to automatically clear, or regenerate, the unique ID once a particular session of a wireless Bluetooth® connection is terminated.

In embodiments where the unique ID is not permanently fixed, but generated, the NFC tag is programmable such that the processor 220 in conjunction with then non-transitory memory 230 generate the unique ID, which is then written to the NFC tag 250 as the setup module. In other embodiments, the unique ID is permanently included in the setup module.

In step 440, the fitness machine then broadcasts an advertising packet using the Bluetooth® protocol that includes the unique ID read from the NFC tag of the wearable accessory in step 420.

In step 430, which is executed in parallel to step 440, the wearable accessory listens for any broadcasted advertising packet that may include the unique ID corresponding its NFC tag. In step 450, the wearable accessory then analyzes each broadcasted advertising packet, such as that sent from the fitness machine, to determine whether the advertising packet does include the unique ID that corresponds to its NFC tag. In the embodiment shown, the comparison of an incoming advertising packet to the unique ID corresponding to an NFC tag is performed by the processor 220 within the control module 208. Once the unique ID is determined to match the NFC tag, the fitness machine and the wireless accessory are then paired using the Bluetooth® protocol in step 460.

The presently disclosed systems and methods for initiating a wireless Bluetooth® connection is simplified by the advertising packets containing information regarding both the source device 100 (the Bluetooth® address and other parameters) and the accessory device 200 (the unique ID).

In contrast to traditional pairing using the Bluetooth® protocol, the present disclosure does not require manual selection of which devices to pair if the accessory device 200 detects advertising packets from multiple source devices 100. In the case of a simple accessory device that does not have a GUI 210, the automatic selection of which devices to pair is necessary to permit pairing of the accessory device 200 using the Bluetooth® protocol at all. Nonetheless, the process is simplified and the time and effort reduced by automating this selection process through the presently disclosed systems and methods.

In contrast to the known methods of initiating a Bluetooth® connection through NFC, the OOM mechanism, the presently disclosed systems and methods enable simplified initiation of Bluetooth® pairing through NFC for accessory devices that do not have NFC readers. Accordingly, the present inventor has identified that the presently disclosed systems and methods support a wider array of wearable devices over the systems and methods known in the art. Since an NFC reader is typically capable of also functioning as an NFC tag, and since NFC tags are smaller, simpler, and more prevalent, the present systems and methods allow wireless pairing of a much larger volume and variety of accessory devices.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

What is claimed is:

1. A system for wirelessly pairing a fitness machine to an accessory comprising:
   a setup module in communication with the fitness machine, the setup module being configured to initiate communication with the accessory using a setup protocol;
   a pairing module in communication with the fitness machine, the pairing module being configured to communicate with the accessory using a pairing protocol, wherein the fitness machine is configured to receive a unique ID from the accessory using the setup protocol, wherein the unique ID is associated with the accessory, and wherein the fitness machine is configured to wirelessly pair with the accessory using the pairing protocol when initiated by the accessory;
   an advertising packet configured to be communicated from the fitness machine to the accessory using the pairing protocol, wherein the advertising packet includes the unique ID received from the accessory; and
   a program that controls the accessory, wherein the program generates the unique ID, and wherein the program analyzes the advertising packet from the fitness machine to identify when the unique ID is included in the advertising packet;
   wherein the fitness machine is configured to wirelessly pair with the accessory when the accessory identifies the unique ID included in the advertising packet and initiates such wireless pairing.

2. The system according to claim 1, wherein a user input initiates the fitness machine receiving the unique ID from the accessory.

3. The system according to claim 1, wherein the setup protocol is near-field communication.

4. The system according to claim 3, wherein the fitness machine is configured to receive the unique ID from a near-field communication tag in communication with the accessory.

5. The system according to claim 1, wherein the unique ID is uniquely associated with a particular unit of the accessory.

6. The system according to claim 1, wherein the unique ID is uniquely associated with a particular session of wirelessly pairing the fitness machine and the accessory.

7. The system according to claim 6, wherein the accessory is in communication with a near-field communication tag that is programmable to store the unique ID therein, wherein the near-field communication tag communicates the unique ID to a near-field communication reader in communication with the fitness machine.

8. The system according to claim 1, wherein the fitness machine is a treadmill and the accessory is a wearable device.

9. A method for wirelessly pairing a fitness machine to an accessory, comprising the steps of:
- providing the fitness machine to be wirelessly paired with the accessory, wherein the fitness machine is configured to wirelessly pair with the accessory using a pairing protocol when such wireless pairing is initiated by the accessory;
- initiating communication and receiving by the fitness machine a unique ID that is communicated from the accessory using a setup protocol, wherein the unique ID is associated with the accessory;
- communicating an advertising packet from the fitness machine to the accessory using the pairing protocol, wherein the advertising packet is associated with the fitness machine and includes the unique ID;
- providing a program that controls the accessory, wherein the program causes the accessory to generate the unique ID, and wherein the program analyzes the advertising packet from the fitness machine to identify when the unique ID included in the advertising packet; and
- wirelessly pairing the fitness machine and the accessory using the pairing protocol when the accessory identifies that the unique ID is included in the advertising packet and initiates such wireless pairing.

10. The method according to claim 9, further comprising the step of providing a user input to the fitness machine to initiate the fitness machine receiving the unique ID.

11. The method according to claim 9, wherein the setup protocol comprises near-field communication.

12. The method according to claim 11, wherein the unique ID is communicated from the accessory using a near-field communication tag.

13. The method according to claim 9, wherein the unique ID is uniquely associated with a particular unit of the accessory.

14. The method according to claim 9, wherein the unique ID is uniquely associated with a particular session of wirelessly pairing the fitness machine and the accessory.

15. The method according to claim 14, wherein the accessory is in communication with a near-field communication tag that is programmable to store the unique ID therein, wherein the near-field communication tag communicates the unique ID to a near-field communication reader in communication with the fitness machine.

16. The method according to claim 9, wherein the fitness machine is a treadmill and the accessory is a wearable device.

17. A system for wirelessly pairing a fitness machine to a wearable accessory, comprising:
- an NFC reader and a pairing radio, each in communication with the fitness machine, wherein the NFC reader communicates using a near-field protocol, wherein the pairing radio communicates using a pairing protocol when initiated by the accessory;
- an NFC tag and a pairing radio, each in communication with the wearable accessory, wherein the NFC tag initiates communication and communicates using the near-field protocol, wherein the pairing radio communicates using the pairing protocol;
- a unique ID that is associated with the accessory and is communicated from the NFC tag to the NFC reader;
- an advertising packet that includes the unique ID and is communicated from the pairing radio of the fitness machine to the pairing radio of the accessory; and
- a program that controls the accessory, wherein the program generates the unique ID, and wherein the program analyzes the advertising packet from the fitness machine to identify when the unique ID is included in the advertising packet;
- whereupon the fitness machine is configured to wirelessly pair with the accessory using the pairing protocol when the accessory identifies the unique ID included in the advertising packet and initiates such wireless pairing.

* * * * *